(12) United States Patent
Neubauer

(10) Patent No.: US 6,206,670 B1
(45) Date of Patent: Mar. 27, 2001

(54) PROCESS FOR THE PRODUCTION IF TRANSVERSELY RIBBED TUBES

(75) Inventor: Gerhard Neubauer, Königsberg (DE)

(73) Assignee: Unicor GmbH Rahn Plastmaschinen (DE)

( * ) Notice: Subject to any disclaimer, the term of this patent is extended or adjusted under 35 U.S.C. 154(b) by 0 days.

(21) Appl. No.: 09/341,064
(22) PCT Filed: Jan. 14, 1998
(86) PCT No.: PCT/DE98/00129
§ 371 Date: Jun. 29, 1999
§ 102(e) Date: Jun. 29, 1999
(87) PCT Pub. No.: WO98/32584
PCT Pub. Date: Jul. 30, 1998

(30) Foreign Application Priority Data

Jan. 25, 1997 (DE) .............................. 197 02 638

(51) Int. Cl.⁷ .................................................. B29C 49/00
(52) U.S. Cl. ...................... 425/107; 425/326.1; 425/336; 425/384; 425/388; 425/392; 425/396
(58) Field of Search ..................................... 425/707, 233, 425/326.1, 336, 384, 388, 392, 396

(56) References Cited

U.S. PATENT DOCUMENTS

| | | | |
|---|---|---|---|
| 3,596,311 | * 8/1971 | Salmon | 425/383 |
| 3,981,663 | 9/1976 | Lupke | 425/326.1 |
| 4,439,130 | 3/1984 | Dickhut et al. | 425/388 |
| 4,504,206 | * 3/1985 | Lupke et al. | 425/326.1 |
| 4,718,844 | * 1/1988 | Dickhut et al. | 425/522 |
| 5,531,583 | * 7/1996 | Berns et al. | 425/193 |
| 5,545,369 | 8/1996 | Lupke | 264/508 |

FOREIGN PATENT DOCUMENTS

| | | |
|---|---|---|
| 2065048 | 6/1972 | (DE) . |
| 2537184 | 3/1977 | (DE) . |
| 2753297 | 6/1978 | (DE) . |
| 19517023 | 6/1996 | (DE) . |
| 0065729 | 12/1982 | (EP) . |
| 0621120 | 10/1994 | (EP) . |

* cited by examiner

Primary Examiner—Harold Pyon
Assistant Examiner—Donald Heckenberg
(74) Attorney, Agent, or Firm—Bachman & LaPointe, P.C.

(57) ABSTRACT

Described is an apparatus for the production of transversely ribbed tubes, having mold jaw halves which bear against each other along a common mold section with front faces and form therebetween a mold passage. Each mold jaw half has vacuum passages which are in flow communication with the mold passage. Each mold jaw half also has a cooling passage (22). The front faces of the mold jaw halves are formed with vacuum communication channels which, along the common mold section, form vacuum communication passages. The vacuum communication passages are in flow communication with a stationary vacuum rail, along the common mold section of the apparatus. Along the common mold section, the cooling passages of the mold jaw halves are in fluid communication with a stationary cooling agent rail which has a cooling agent feed means and a cooling agent discharge means.

6 Claims, 4 Drawing Sheets

US 6,206,670 B1

PROCESS FOR THE PRODUCTION IF TRANSVERSELY RIBBED TUBES

BACKGROUND OF THE INVENTION

The invention concerns an apparatus for the production of transversely ribbed tubes, which has mold jaw halves which bear against each other along a common mold section with first and second front faces and form therebetween a mold passage, wherein each mold jaw half has vacuum passages which are in flow communication with the mold passage, and a cooling passage.

An apparatus of that kind is known for example from EP 0 065 729 A1. In that known apparatus the vacuum passages and the cooling passages open out on the same side of the mold jaw halves so that it is not possible reliably to prevent cooling fluid from passing into the vacuum passages. That can have an effect on operational reliability.

An apparatus for the production of transversely ribbed tubes with mold jaw halves provided with vacuum passages which are in flow communication with a mold passage of the mold jaw halves, the mold passage being formed along a mold section, is also known for example from DE 27 53 297 A1 or U.S. Pat. No 3,981,663.

DE 25 37 184 A1 discloses an apparatus for the production of transversely ribbed tubes, which has mold jaw halves which each have a cooling passage. The cooling passages of the mold jaw halves are in flow communication with cooling conduit loops in order to produce a desired cooling effect for the mold jaw halves.

The applicants' DE 195 17 023 C1 discloses an apparatus for the production of transversely ribbed tubes, having mold jaws which bear closely against each other with their front faces along a common mold section. In that known apparatus, along the common mold section, the mold jaws form at least two spaced-apart mold passages. Each mold passage communicates with associated vacuum passages, while the vacuum passages of adjacent mold passages in each mold jaw are in flow communication with each other through communicating passages. Valve devices in that arrangement serve to provide for a flow communication between the respective mold passage wanted, and a vacuum source.

The object of the present invention is to provide an apparatus of the kind discussed above, with which high-quality transversely ribbed tubes can be produced using structurally simple means, with a high level of productivity.

SUMMARY OF THE INVENTION

In accordance with the invention, in an apparatus of the kind discussed above, that object is attained in that the first front faces of the mold jaw halves are provided with vacuum communication passages which open out at a first surface of the mold jaw halves, that provided at the mold section is a stationary vacuum bar or rail which is in flow communication with the vacuum communication passages of the respective mold jaw halves which are disposed at the mold section, that the cooling passage of the respective mold jaw half has, at a second surface which is different from the first surface, a cooling agent feed means and a cooling agent discharge means, and that provided at the mold section is a stationary cooling agent bar or rail which is in fluid communication with the cooling agent feed means and with the cooling agent discharge means of the respective mold jaw halves which are disposed at the mold section.

The apparatus according to the invention has the advantage that the vacuum connection and the cooling agent connection to the respective mold jaw halves which are at the mold section are provided at surfaces which are different from each other, of the mold jaw halves, so that cooling agent is reliably prevented from unintentionally passing into the vacuum passages, while using structurally simple means. A further major advantage of the apparatus according to the invention is that a sound, reliable flow communication between the vacuum source and the vacuum passages of the respective mold jaw halves which are at the mold section is guaranteed by the stationary vacuum bar or rail and in addition a sound, reliable fluid communication of the cooling passages of the last-mentioned mold jaw halves is guaranteed by the stationary cooling agent bar or rail, wherein the mold jaw halves are movable at a high speed of forward movement, thus resulting in a correspondingly high level of productivity for the apparatus according to the invention.

It has proven to be desirable if, in the apparatus according to the invention, a guide and slide element is fixed to the first surface of each mold jaw half and if each mold jaw half is connected to a support element which establishes the second surface and which is guided along the mold section at the cooling agent bar or rail. It is desirable if the first and second surfaces are disposed in mutually opposite relationship and are arranged in mutually parallel relationship. Such a design configuration affords the advantage that the vacuum connection and the cooling agent connection do not impede or adversely affect each other, but can be arranged without any problems, as desired. Preferably the first and the second surface of the mold jaw halves are oriented horizontally and their front faces are oriented perpendicularly.

The guide and slide element and the support element of each mold jaw half of the apparatus according to the invention preferably comprise the same material. That material is preferably an abrasion-resistant material, for example high-quality steel.

The mold jaw halves preferably comprise a material which has a high coefficient of thermal conduction. That material is for example aluminum. Such a design configuration not only results in the individual mold jaw halves being of a relatively low overall weight, so that the drive power for producing the forward feed movement of the mold jaw halves can be correspondingly reduced, but it also results in optimum cooling for the mold jaw halves, which also has a corresponding positive effect on the operational reliability and the productivity of the apparatus according to the invention as well as on the quality of the transversely ribbed tubes produced with the apparatus according to the invention.

So that the apparatus according to the invention can be used with mold jaw halves for producing transversely ribbed tubes of different dimensions, it is desirable if the mold jaw halves can be connected to the associated support elements by means of quick-action clamping devices. When using quick-action clamping devices of that kind, it is possible, with a concomitant saving of time, to fix the respectively wanted mold jaw halves of a set of mold jaws for transversely ribbed tubes of given dimensions to the support elements of the apparatus according to the invention, so that thereafter the apparatus when equipped in that fashion can be used to produce the desired transversely ribbed tubes.

In order to compensate for dimensional tolerances of the mold jaw halves, which often cannot be avoided, and in order to compensate in particular also for thermal expansion phenomena in respect of the mold jaw halves, it is preferred if, in the apparatus according to the invention, the vacuum bar or rail is elastically yieldingly mounted to a stationary vacuum head.

The cooling agent bar or rail preferably has a central cooling agent circulation portion and two oil-lubricated guide portions laterally adjoining same. In that arrangement, the oil-lubricated guide portions desirably comprise an abrasion wear-resistant metal and the central elongate cooling agent circulation portion comprises a sliding or bearing metal alloy. Said metal may be high-quality steel while the bearing metal alloy may be bronze.

BRIEF DESCRIPTION OF THE DRAWINGS

The invention will now be described in greater detail by means of the following description of an embodiment of the apparatus according to the invention for the production of transversely ribbed tubes, as illustrated in the drawings in which.

DETAILED DESCRIPTION OF PREFERRED EMBODIMENTS

Figure 1:
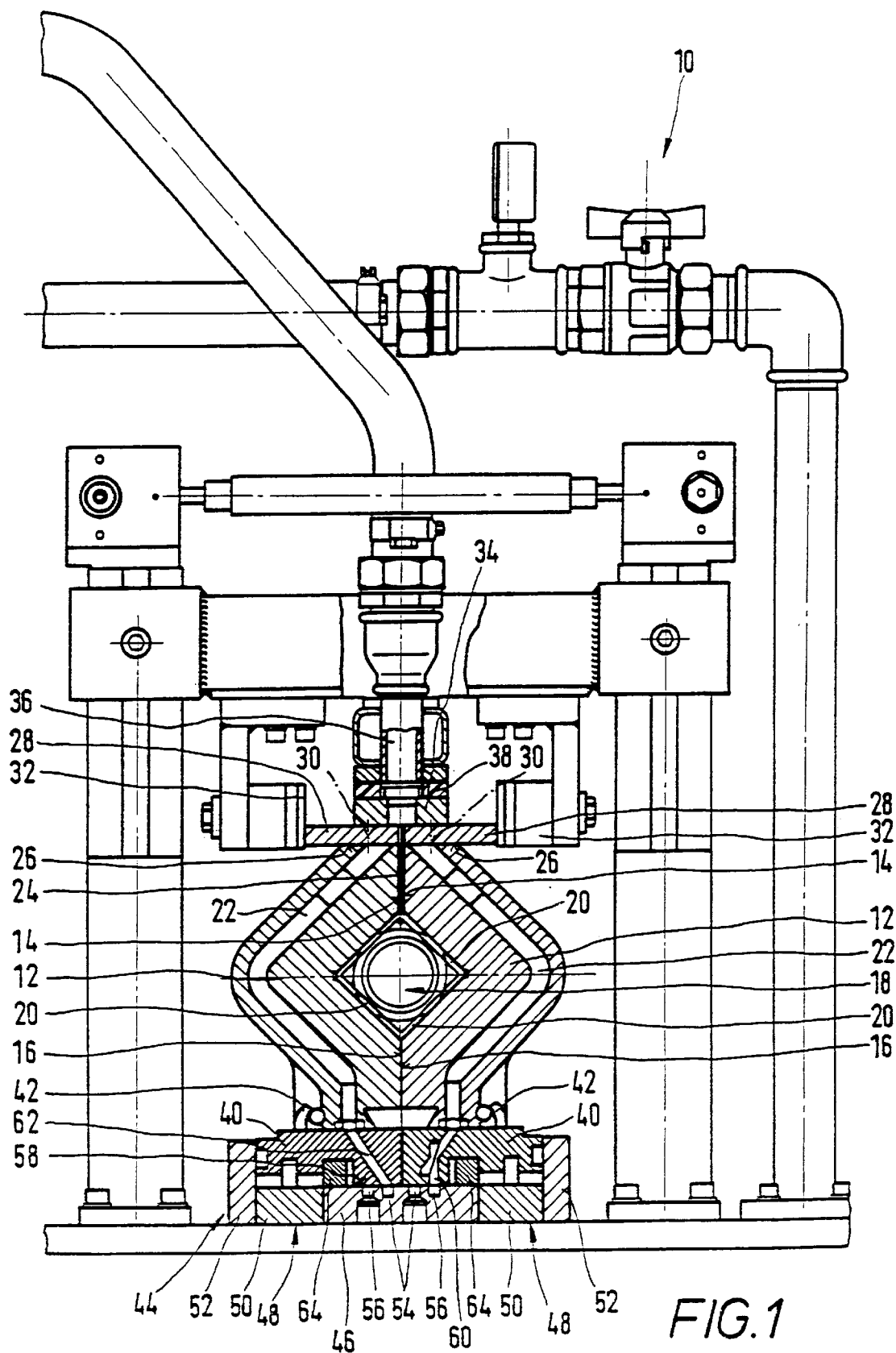
FIG. 1 is a partly sectional front view of parts of the apparatus in the region of the mold section of the mold jaw halves.

Referring to FIG. 1, shown therein is a partly sectional front view of an embodiment of the apparatus 10 for the production of transversely ribbed tubes, having mold jaw halves 12 which bear against each other along the common mold section illustrated in FIG. 1, with their first front faces 14 and with their second front faces 16 which each define a respective common vertical plane. Between the first and second front faces 14 and 16 the mold jaw halves 12 form a mold passage 18, along the common mold section. Each mold jaw half 12 has vacuum passages 20 which are in flow communication with the mold passage 18, that is to say which open into the mold passage 18.

The mold jaw halves 12 are also each provided with a respective cooling passage 22.

Figure 2:
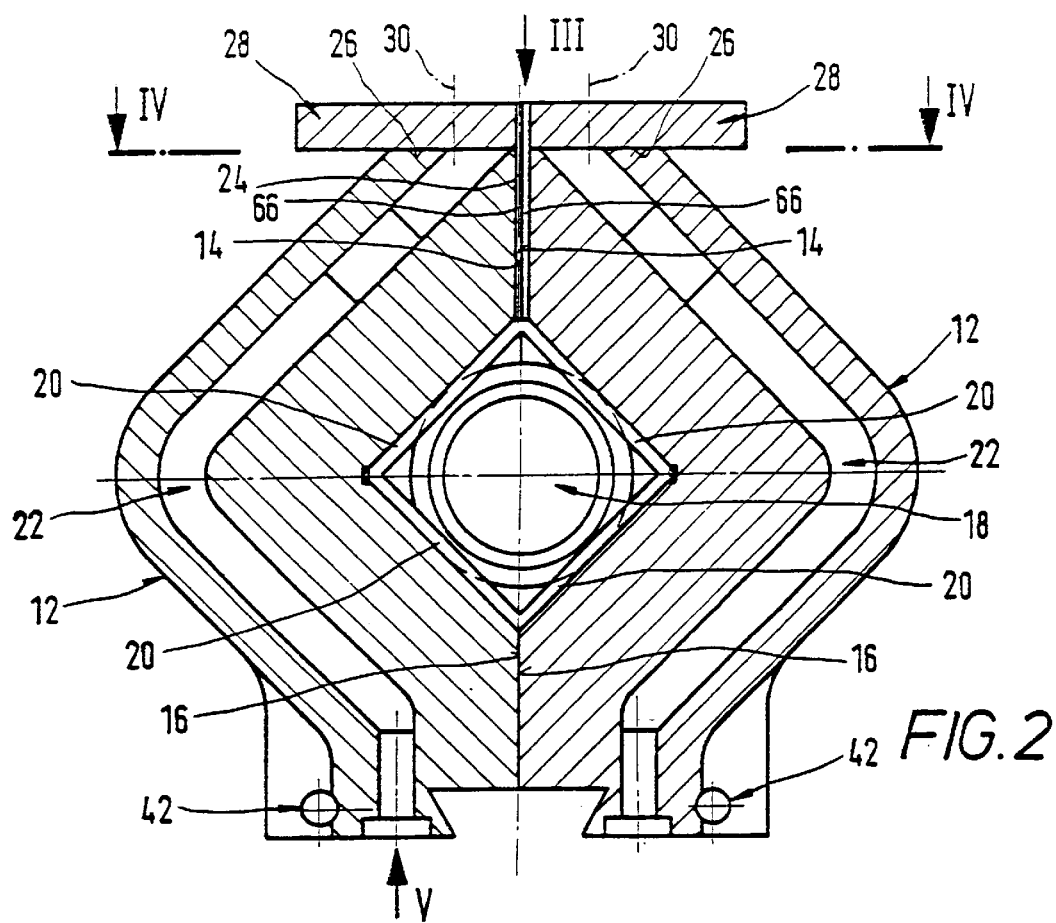
FIG. 2 is a sectional view of two mold jaw halves at the common mold section in combination with the associated guide and slide elements at the top side of the two mold jaw halves.
Figure 3:
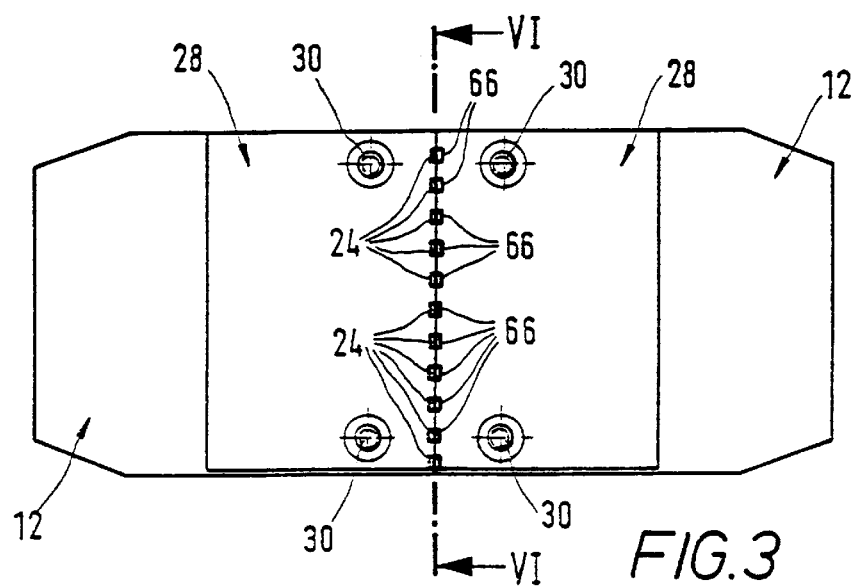
FIG. 3 is a view of the two mold jaw halves viewing in the direction of the arrow III in FIG. 2, that is to say viewing from above.
Figure 6:
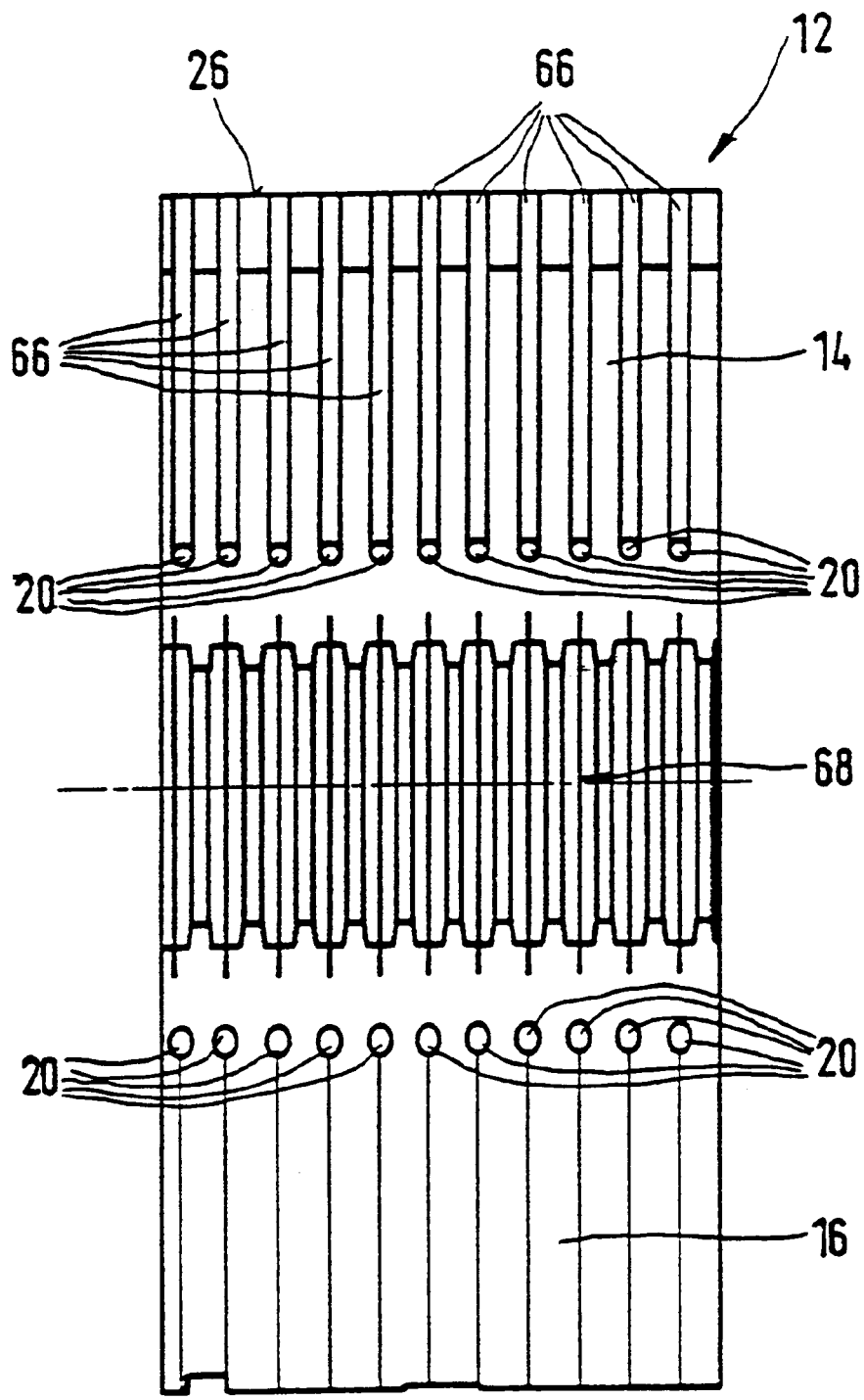
FIG. 6 is an end view of a mold jaw half as viewed along the arrows VI—VI in FIG. 3.

As can be seen from FIGS. 2, 3 and 6, the first front faces 14 of the mold jaw halves 12 are provided with vacuum communication passages 24 which open out at a first surface 26 of the mold jaw halves 12. A guide and slide element 28 is fixed to the first surface 26 of each mold jaw half 12. That fixing is effected for example by means of screws, the center lines of which are illustrated in FIGS. 1 and 2 by thin dash-dotted lines 30. The guide and slide elements 28 serve not only for linear guidance of the mold jaw halves 12 along stationary guide members 32 but in addition also for sealing off the cooling passages 22 at the top side or at the first surface 26 of the mold jaw halves 12.

A vacuum bar or rail 34 is stationarily provided centrally between the guide members 32 along the common mold section of the apparatus 10. The vacuum rail 34 is elastically yieldingly secured to a stationary vacuum head 36. The elastically yielding nature is afforded by means of a spacer element 38. The spacer element 38 comprises for example a silicone foam rubber. It also serves for mechanical compensation of tolerances in respect of height and for compensation of the thermal expansion phenomena in respect of the mold jaw halves 12. The vacuum rail 34 can comprise a suitable plastic material. Along the common mold section the vacuum communication passages 24 provided at the first front faces 14 of the mold jaw halves 12 communicate with the vacuum rail 34, thereby insuring the flow communication between a vacuum source (not shown) and the vacuum passages 20 or the mold passage 18 along the common mold section of the mold jaw halves 12.

Provided at the underside of each mold jaw half 12, which faces away from the first surface 26, is a support element 40, wherein the respective support element 40 can be connected or is fixedly connected to the associated mold jaw half 12 by means of a quick-action clamping device 42. The support elements 40 and the guide and slide elements 28 comprise the same material, for example high-quality steel. The mold jaw halves 12 are guided linearly by means of the associated support elements 40 along a cooling agent bar or rail 44 which is parallel to the vacuum rail 34. The cooling agent rail 44 at the underside has a central cooling agent circulation portion 46 and two lateral oil-lubricated guide portions 48 adjoining same. Each of the two oil-lubricated guide portions 48 has a horizontal bar or rail 50 and a vertical bar or rail 52 laterally adjoining same. The central cooling agent circulation portion comprises a sliding or bearing metal alloy, for example bronze. It has two cooling agent discharge channels 54 and two cooling agent feed channels 56 which are provided along the common mold section of the apparatus 10.

The support elements 40 provided at the underside of the mold jaw halves 12 establish a second surface 58 which is parallel to the first surface 26 at the top side; the second surface 58 of each support element 40 has a cooling agent feed means 60 and a cooling agent discharge means 62 which are connected along the common mold section to the associated cooling agent feed channels 56 and the cooling agent discharge channels 54 so that the cooling agent can flow through the cooling passages 22 in order to cool the mold jaw halves 12 which are provided along the common mold section.

In order to provide a reliable lubricating oil barrier as between the two lateral oil-lubricated guide portions 48 of the cooling agent rail 44 at the underside, and its central cooling agent circulation portion 46, the arrangement has barrier bars or rails 64 along the common mold section.

As FIG. 2 and in particular FIG. 3 clearly show, the vacuum communication passages 24 are established by means of channels 66 which are provided at the first front faces 14 of the mold jaw halves 12 and which extend through the guide and slide elements 28 fixed to the mold jaw halves 12 at the top side thereof. The channels 66, which communicate with the vacuum passages 20, at the first front face 14 of each mold jaw half 12 can also be clearly seen from FIG. 6. FIG. 6 also shows the corresponding half 68 of the mold passage of the respective mold jaw half 12 with the corrugated or ribbed surface structure, whereby the outside contour of the transversely ribbed tubes to be produced is then defined along the common mold section of the mold jaw halves.

Figure 4:
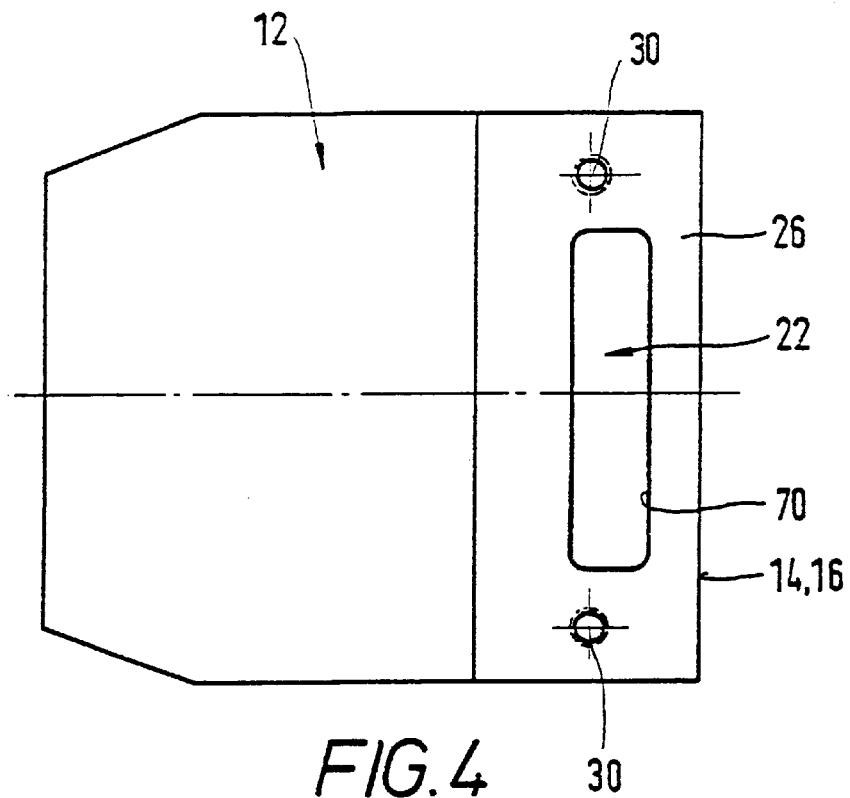
FIG. 4 is a view of the left-hand mold jaw half shown in FIG. 2 viewing in the direction of the arrows IV—IV in FIG. 2.

FIG. 4 is a view from above showing a mold jaw half 12, wherein it is possible to see the first surface 26 having a hole 70 which is defined by the cooling passage 22. That hole 70 at the first surface 26 is then sealingly closed by the associated guide and slide element 28 (see FIGS. 1 and 2).

Figure 5:
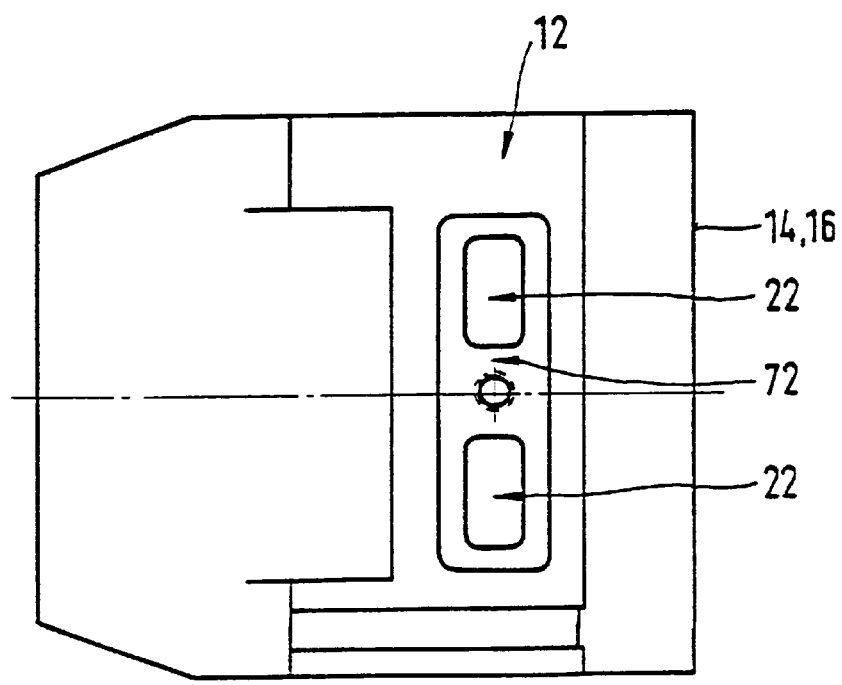
FIG. 5 is a view of the left-hand mold jaw half shown in FIG. 2 viewing in the direction of the arrow V, that is to say viewing from below.

FIG. 5 shows a mold jaw half 12 in the direction of viewing from below, to clearly illustrate the cooling passage 22 which is divided into two by a central web portion 72, wherein the one limb of the cooling passage 22 is in fluid communication with the cooling agent feed means 60 of the associated support element 40 and the other limb of the cooling passage 22 is in fluid communication with the cooling agent discharge means 62 of the associated support element 40.

The same details are identified in each of FIGS. 1 to 6 by the same respective reference numeral.

What is claimed is:

1. Apparatus for the production of transversely ribbed tubes, comprising:

mold jaw halves which bear against each other along a common mold section with first and second front faces thereof and which form a mold passage therebetween;

vacuum passages inflow communication with the mold passage;

a cooling passage in each mold jaw half;

cooling agent feed means and cooling agent discharge means communicating with said cooling passages;

wherein the first front faces of the mold jaw halves are provided with vacuum communication channels which open out at a first surface of the mold jaw halves;

a stationary vacuum rail provided adjacent the common mold section in flow communication with the vacuum communication channels and the vacuum passages of the mold jaw halves;

a stationary cooling agent rail adjacent the mold section in fluid communication with said cooling agent feed means and said cooling agent discharge means;

wherein the cooling passages of the mold jaw halves have at a second surface thereof which is different from the first surface, said cooling agent feed means and said cooling agent discharge means;

wherein said first surface and said second surface are remote from and in opposite relationship to each other and are substantially in mutually parallel relationship;

a guide and slide element connected to the first surface of each mold jaw half;

wherein each mold jaw half is connected to a support element which establishes said second surface and which is guided along the mold section at the cooling agent rail, and wherein the guide and slide element and the support element of the mold jaw halves comprise the same material; and wherein said cooling agent feed means and discharge means are adjacent said second surface, and said vacuum communication channels are adjacent said first surface.

2. Apparatus according to claim 1, wherein the mold jaw halves comprise aluminum.

3. Apparatus according to claim 1, wherein the mold jaw halves are connected to support elements by clamping devices.

4. Apparatus according to claim 1, wherein the stationary vacuum rail is elastically yieldingly mounted to a stationary vacuum head.

5. Apparatus according to claim 1, wherein said cooling agent rail has a central cooling agent circulation portion and oil-lubricated guide portions which laterally adjoin said central cooling agent circulation portion.

6. Apparatus according to claim 5, wherein the oil-lubricated guide portions comprise an abrasion and wear resistant metal and the central cooling agent circulation portion comprises a sliding metal alloy.

* * * * *